Dec. 14, 1965   S. G. JOHNSON   3,222,793
ADJUSTABLE GAGE AND GAGING ELEMENT MOUNTING MEANS
Filed May 24, 1963
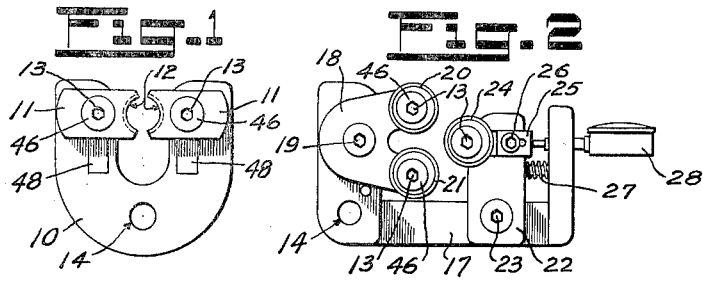
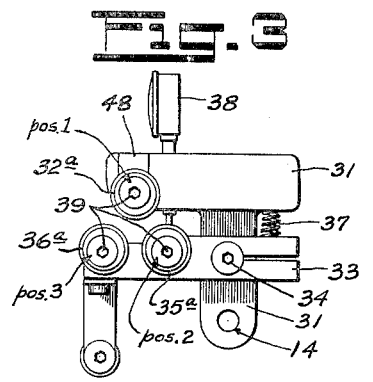
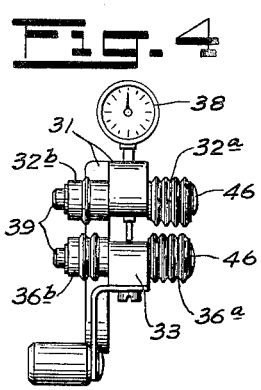
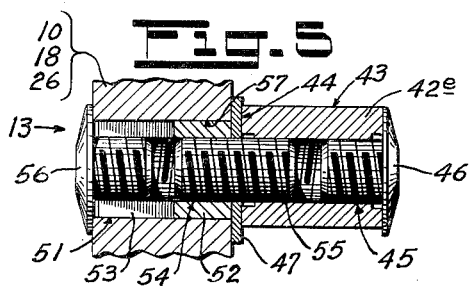
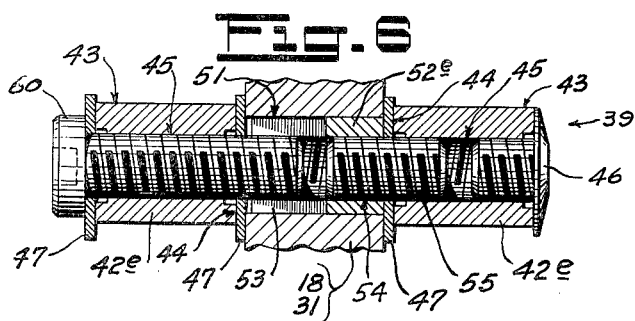
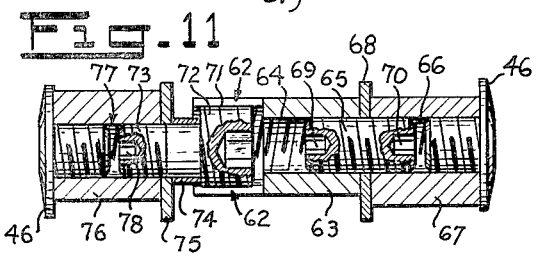
INVENTOR.
STANLEY G. JOHNSON
BY
John M. Montstream
ATTORNEY United States Patent Office 3,222,793
Patented Dec. 14, 1965

3,222,793
ADJUSTABLE GAGE AND GAGING ELEMENT MOUNTING MEANS
Stanley G. Johnson, West Hartford, Conn., assignor to The Johnson Gage Company, Bloomfield, Conn., a corporation of Connecticut
Filed May 24, 1963, Ser. No. 282,916
11 Claims. (Cl. 33—199)

The invention relates to an adjustable gage having gaging elements of any type such as a pivoted segment or a gaging roll. hTe gage may be of the go and not-go type or may be a comparator type using an indicator. The gages use a mounting means for the gaging elements or means which mounting means uses the stud of the Paul W. Johnson Patent Number 2,826,821 dated March 18, 1958. The invention is directed also to the mounting means by means of which the adjustment of the stud and hence adjustment of the gaging element is secured.

It is an object of the invention to construct an adjustable gage utilizing as a part of the mounting means for a gaging element, a hardened stud having an outer cylindrical surface forming a bearing surface for the gaging element or means which bearing surface constitutes the largest diameter on the stud and also having at least one end accurately squared with respect to the gaging element bearing surface.

Another object of the invention is to construct an adjustable gage of a dual type and of simple, inexpensive form having two sets of gaging elements or means and the mounting means for two gaging elements of each set of gaging means utilize the stud above referred to for each of the gaging elements.

A further object is to construct a new mounting means for a gaging element which utilizes the stud described above and includes a drag bushing secured thereto which may have an eccentric or concentric securing hole therein with respect to its outer bearing surface.

A still further object is to construct a mounting means for an adjustable gage which mounting means includes a drag bushing and a stud as described above at each end of the mounting means.

Other objects of the invention will be more apparent from the following description when taken in connection with the accompanying drawings illustrating preferred embodiments thereof in which:

FIG. 1 is a side view of an adjustable gage of the go or not-go type and in which the gaging elements are segments;

FIG. 2 is a side view of a comparator type of gage having three gaging rolls, two of which are mounted on a pivotal frame member;

FIG. 3 is a side view of another comparator gage having three gaging rolls, two of which are mounted on a pivoted arm;

FIG. 4 is a front view of the gage of FIG. 3;

FIG. 5 is an enlarged longitudinal sectional view through the mounting means which mounts a single gaging element;

FIG. 6 is an enlarged longitudinal sectional view through the mounting means mounting including a stud at each end thereof and each to mount a gaging element;

FIG. 7 is an end view of a stud having an eccentric securing hole;

FIG. 8 is an end view of a stud having a concentric securing hole;

FIG. 9 is an end view of a drag bushing having an eccentric securing hole;

FIG. 10 is an end view of a drag bushing with a concentric securing hole; and

FIG. 11 is an enlarged longitudinal sectional view through a modification of the mounting means shown in FIG. 6.

A stud for a gaging element is described in the aforesaid patent, having an outer cylindrical bearing surface for a gaging element which bearing surface is the maximum diameter of the stud. This stud has at least the inner end, which contacts a frame means or a base plate, accurately squared with respect to the cylindrical bearing surface. Preferably both ends are accurately squared with respect to the bearing surface. The studs will be described in detail hereinafter. The frame means has a surface or surfaces which is or are engaged by the end of the studs and are accurately in the same plane or in accurate parallel planes. This stud has the numerous advantages in production, assembly and use set forth in the patent, the principal one being that the studs by virtue of their squared ends and the frame surfaces are mounted with their axes parallel irrespective of usual manufacturing inaccuracies in the other elements of the stud and frame means. A hardened base plate may be and preferably is used at the inner end or both ends of the stud, however, this does not affect the ability of the axes of the studs to be parallel because of the squared end.

The adjustable gage includes frame means which may be a simple frame 10 such as shown in FIG. 1 for use as a go or not-go gage. The gage has spaced gaging elements 11, shown as pivotal gaging segments in that the gaging surfaces 12 are arcuate and spaced from mounting means 13 carried by the frame means and upon which the segment pivots. The frame means may have a hole 14 to mount the gage on a base.

A go gage is one in which the gaging elements are set to pass a test part therebetween, that is one which is not oversize, but will not pass a test part which is oversized or has cumulative errors which are the equivalent of an oversized test part. If the test part passes through the gaging elements of a go gage it is known that the test part is not too large, although it may be too small. This test part will assemble with a proper mating hole. A test part which does not pass through the gaging elements, is outside of the tolerances of an acceptable test part and will not assemble with a proper mating hole.

There is a second gage used in conjunction with a go gage which usually tests for pitch diameter so that if the test part passes through this not-go gage, it is known that the diameter is too small and unacceptable. If the test part fails to pass through the not-go gage it is known that the test part is not too small and hence is acceptable. In other words, an acceptable test part must pass through the go gage but must not pass through the not-go gage and such a test part is within the acceptable tolerances set into the gage. At least one and preferably, each gaging element is mounted on the frame means on a mounting means utilizing the stud above referred to. In a gage of the type of FIG. 1, one is or both studs are, adjustable thereby adjusting one gaging element with respect to the other for the desired size or setting. Usually a go gage and a not-go gage are mounted on one frame means.

FIG. 2 shows a comparator type of gage utilizing three gaging rolls. This gage has frame means of three parts namely a U-shaped main frame 17 on which is mounted a pivotal frame 18 mounted on a frame pivot 19 and which pivotal frame carries two spaced gaging elements or rolls 20 and 21. The frame means also includes a pivoted arm 22 mounted on the main frame on an arm pivot 23 with a gaging element or roll 24 spaced from the arm pivot and in cooperative position opposite the gaging elements 20 and 21 when the latter are in gaging position as shown. The gaging roll 24 is mounted on a slider 25 adjustably carried by the arm so that the position of the gaging roll may be adjusted thereon with respect to the other gaging elements for different sizes of test parts. A lock screw 26 holds the slider in adjusted position. A spring 27 presses the arm towards the gaging rolls carried by the pivotal frame. A dial indicator 28 is mounted on the U-shaped frame and its contactor engages the arm or the slider to indicate the position of the movable gaging roll and hence indicating whether or not the test piece inserted between or within the gaging rolls is within the permissible tolerances. The gaging elements or rolls are mounted upon mounting means 13 which will be described.

FIGS. 3 and 4 shows a gage having two sets of three gaging elements or rolls and is of the comparator type. The frame means in this construction includes a main frame 31. A gaging element 32a shown as a roll, is mounted on mounting means 39 carried by the main frame. The frame means also includes a pivotal arm 33 pivotally mounted on an arm pivot 34 carried by the main frame. This arm carries a pair of spaced mounting means 39 on which are mounted gaging elements 35a and 36a shown as gaging rolls. A spring 37 propels the pivotal arm and hence the pair of gaging rolls of a first set of gaging means carried thereby towards its cooperating single gaging roll 32a. A dial indicator 38 is carried by the main frame, the contactor of which engages the pivoted arm and indicates the position of the arm and hence the position of the pair of gaging rolls. The reading of the dial indicator, with a test part between the rolls, determines whether or not the test part is within the acceptable tolerances. Each of the gaging rolls are mounted on mounting means which will be described.

In the gage of FIGS. 3 and 4, each mounting means carries a pair of gaging rolls or elements. Each of one set of gaging rolls 32a, 35a and 36a is relatively long with a plurality of thread engaging ridges thereon so that a relatively long portion or the entire length of the test thread is contacted thereby. This set of gaging elements tests for the overall assemble-ability of the test part, that is, the gaging elements are responsive to cumulative errors in the test thread and hence determines whether or not the test thread will assemble with the threaded mating hole which is to receive the test part.

A second set of three gaging rolls 32b, 35b and 36b are also carried by the mounting means 39 on the other side of the frame means. These gaging rolls usually will have one, or two, or sometimes three, thread gaging ridges which ridges are truncated to engage a test thread at the pitch diameter. The single indicator 38 is uesd to indicate the position of the pivotal arm and hence the position of the two gaging elements 35b, and 36b carried by the arm in order to determine whether or not the pitch diameter is within the allowable tolerances. If the indicator with a test part in the second set of gaging rolls is within the permissible tolerances it will be indicated on the indicator. A comparator type of gage permits selective assembly, if this should be desired in that large threads may be matched with large holes to receive the test part and similarly smaller diameter test parts may be seggregated for assembly with smaller holes to receive the same.

The mounting means 13 for a gage of the types particularly shown in FIGS. 1 and 2, is shown in FIG. 5. This mounting means includes a hardened stud 42, described in the aforesaid patent, having an outer cylindrical bearing surface 43 accurately ground to size on which the gaging element is mounted for pivotal movement if a segment type of gaging element or rotatably mounted for a roll type of gaging element. This bearing surface is the largest on the stud so that it may be inexpensively and accurately ground on a centerless grinder. At least the inner end surface 44 is accurately squared with respect to the bearing surface and preferably the outer end is also accurately squared with respect to the bearing surface so that either end may be assembled on the frame at the inner end. The outer end carries shoulder means to retain a gaging element on the stud. The construction shown uses a threaded hole 45 to receive a shoulder means 46 such as a screw having a head which extends above the diameter of the bearing surface of the stud in order to retain the gaging element on the stud. Preferably a hardened base plate or washer 47 is utilized between the inner end of the stud and the soft frame means although such base plate is not necessary. The face of the frame is accurately ground and to this end a pad 48 on the frame may be provided and the face of the pivotal arms, pivoted frame and slider may be ground. It is simpler to have a single threaded hole extending through the stud as shown.

The frame means carries a mounting hole 51 which receives a drag bushing 52 forming a part of the mounting means. This drag bushing has an outer cylindrical surface which will usually be about three thousandths of an inch smaller in diameter than the mounting hole in the frame means so that any inaccuracies in the drag bushing or the frame mounting does not interfere with the squared end of the stud contacting throughout its end surface with the base plate or frame. The drag bushing has slot means 53 at its end oppositely from the end adjacent the stud and with the bushing slot the ends may be spread slightly to provide a drag in the hole when the angular position of the stud is adjusted. The bushing has a threaded securing hole 54 therethrough and a short securing screw 55 is received in the end of the securing hole 45 of the stud and the end of the securing hole in the drag bushing to secure the stud and bushing together as well as securing a base plate therebetween when used. A lock screw 56 is received in the slotted end of the bushing to clamp the mounting means in adjusted position on the frame means. With the end of the lock screw within the drag bushing being shorter than the slots or slot means, the threads spread the slotted end of the drag bushing for additional clamping and drag.

In the construction illustrated in FIG. 5, the securing hole 45 in the stud is eccentric with respect to the outer bearing surface 43. The securing hole 54 in the drag bushing is concentric with its outer bearing surface 57. Consequently by turning the mounting means in the mounting hole in the frame means, the position of the bearing surface 43 of the eccentric stud and its gaging element is adjusted with respect to the studs of the other mounting means and their cooperating gaging elements forming a part of the gage. The spread slotted end of the bushing provides sufficient drag for making and retaining the adjustment made. Tightening of the clamping screw 56 locks the mounting means and particularly the stud in adjusted position. Adjustment of the stud will necessarily adjust the position of the gaging element mounted thereon. This mounting means for the stud and gaging element is used for one or more of the gaging elements or rolls of the gages of FIGS. 1 and 2 and is used for the comparator gage of FIGS. 3 and 4 if solely one set of gaging elements is provided for this gage.

For a gage having two sets of gaging elements as shown particularly in the gage of FIGS. 3 and 4, the mounting means of FIG. 6 is used. In this construction the drag bushing 52e is like that described with respect to FIG. 5 excepting that the securing hole 54 is eccentric with respect to the outer bearing surface 57 of the bushing. This eccentricity is equal to the eccentricity of the securing hole 45 in the stud of FIG. 7 and the axes of the bearing surface of the bushing and of the bearing surface of this first stud are in alignment so that rotation of the mounting means, including the bushing and the stud, will effect no adjustment of the stud and hence no adjustment of the gaging element carried thereby. The mounting means for this dual type of gage includes a second identical stud having a threaded securing hole therethrough which is eccentric with respect to the bearing surface. A locking screw 60 is received in the securing hole of the drag bushing which is long enough to pass through the second stud. Since the screw threads in the stud will not match that of the drag bushing as to the starting thread an eccentric relationship will be secured. If it should happen not to be eccentric then another stud is selected. Preferably base plates are used at both ends of the second stud. Upon unloosening of the locking screw and turning the mounting means with respect to the frame hole through an angle, the angular position of the threads in the securing hole of the bushing is altered so that when the locking screw is again tightened, the angular position of the second stud has changed which, because of its eccentricity, adjusts the position of the bearing surface of this stud with respect to the other mounting means or their studs and hence adjusts the gaging element on the frame means. It will be observed, therefore, that turning of the mounting means effects no change in position of the bearing surface of the first stud but it does change the position of the bearing surface of the second stud. This mounting means, positioned as shown, is used for the gaging elements in positions 1 and 2, (pos. 1, pos. 2). The mounting means for position 3 is the same but is reversed so that the second stud is on the right and the first stud is on the left.

In adjusting a dual gage, the mounting means in position 1 will effect no adjustment of the first or right hand stud and its gaging element. The indicator is set to zero with respect to this gaging element. By adjusting the position of the second stud in the manner described, the bearing surface of the stud is adjusted and hence the position of the gaging element carried thereby until the position of the gaging element is also zeroed on the indicator. A setting plug for each set of gaging elements is used for making the settings.

Any adjustment of the mounting means and its first stud in position 2 will effect no adjustment of its gaging element. However, adjustment of the mounting means in this position will effect adjustment of the second stud and its gaging element with respect to its cooperating gaging element in position 1. Adjustment of the mounting means in position 3 which is the reverse of that illustrated in FIG. 6, will secure adjustment of the bearing surface of the second stud 36a and of its gaging element with respect to the gaging element of positions 1 and 2. Adjustment of this mounting means in position 3, however, will effect no adjustment of the first stud and its gaging element with respect to its cooperating gaging elements in positions 1 and 2. With the mounting means as described, an inexpensive adjustable dual gage is provided in which adjustment is secured for zeroing both sets of gaging elements with respect to the indicator and adjustment of one of the gaging elements carried by each of the mounting means on the pivotal arm is secured for adjustment of each set of gaging elements as to size.

With respect to the mounting means of FIG. 5 it is apparent that a stud having a concentric securing hole as shown in FIG. 8 may be assembled with the drag bushing having an eccentric securing hole. Adjustment of the mounting means and hence of its gaging element would be secured by virtue of the eccentricity of the securing hole in the bushing. It is advantageous, however, to provide one stud solely for all gages and a stud with an eccentric securing hole as shown in FIG. 7 is used in all of the types of gages which may be manufactured. It is for this reason that two different drag bushings, which is a relatively inexpensive part is provided one with a securing hole which is concentric with its outer bearing surface as shown in FIG. 5 and a second drag bushing is provided in which the securing hole is eccentric with respect to the bearing surface as described and shown in FIG. 6. In other respects the bushings are the same. With these two bushings a single form of stud need be provided for all gages.

A simple way for constructing the mounting means of FIG. 6, is to make an oversized drag bushing and assemble it with an eccentric stud with a lock screw. Then by mounting the stud in a chuck which engages the outer bearing surface and turning the bushing in a lathe, the outer bearing surface of the bushing is turned down so that its outer bearing surface is concentric with the outer bearing surface of the stud. The axes of the outer bearing surface of the bushing and of the stud are not only of the same eccentricity but the axes of the two bearing surfaces are in alignment which is necessary in order to permit turning of the mounting means within the hole in the frame means without effecting any change in the position of the bearing surface of the first stud.

The term frame means as used herein encompasses the single U-shaped frame of FIG. 1; the main frame and the pivotal frame and the pivotal arm of FIG. 2 as well as the main frame and the pivotal arm of FIGS. 3 and 4.

The mounting means for a gaging element as described encompasses an eccentric stud and a bushing with a concentric securing hole as shown in FIG. 5; a stud with an eccentric securing hole as shown in FIG. 8 and a bushing with an eccentric securing hole as shown in FIG. 6; and also a first stud with an eccentric securing hole and a bushing with an eccentric securing hole and second stud with an eccentric securing hole as shown in FIG. 6.

The adjustments described enable adjustment for triangulation which is of no great significance for relatively large diameter test parts but can be a factor in gaging accuracy in smaller diameter test parts.

A comparator type of gage using segments may be made by mounting a segment in FIG. 2 on the mounting means and also on the pivot.

The mounting means of FIG. 5 may be used as pivots for the pivoted arms as well as for the pivot for the pivoted frame 19. The gage of FIG. 2 may also be assembled as a dual gage with two sets of gaging elements.

FIG. 11 shows another form of duplex mounting means for the gaging elements of a duplex gage. This mounting means includes a bushing 63 which is received in a bore in the frame. The bushing is about one sixty-fourth of an inch shorter than the thickness of the frame. The bushing has a smaller threaded hole 64 therein in which is received a headless screw 65 which projects from the end of the bushing. The projecting end of this screw 65 is threaded into the threaded bore 66 of the stud 67. Preferably an end washer 68 is positioned between the end of the bushing 63 and the stud 27 to engage the end of a gaging element mounted on the stud. The bushing 63, screw 65 and stud 67 are secured or locked together as a single or first unit by applying any known adhesive to the threads of the screw. This necessarily secures the end washer 68 as a part of the unit. The shoulder means 46 provides a shoulder for the end of the stud to retain the gaging element or member on the stud. The threaded hole 66 through the stud 67 is eccentric with respect to the periphery of the stud so that it provides an eccentric unit. Turning of the stud and bushing unit within the frame bore changes or adjusts the position of the stud and its periphery and hence of the gaging element carried thereby for adjustment of this gaging element with respect to a cooperating gaging element or elements forming the complete gage. A hex wrench received in the sockets 70 or 69 will effect the adjustment.

The other end of the bushing 63 carries an enlarged threaded bore 71 which receives a screw 72 which has a threaded extension 73 of smaller diameter. This end of the bushing has slots 62 which end is expanded to provide a drag when inserted in the frame. A spacer 74 and an end washer 75 is carried on the threaded extension 73 as well as a stud 76. A gaging element is received on this stud. Although the threaded bore 77 of the stud is eccentric with respect to the outer periphery of the stud, the thread 72 is eccentric an equivalent amount so that the thread 72 and the periphery of the stud 76 are concentric and therefore the periphery of the stud 76 is concentric with the periphery of the bushing 63 when the screw 72 is threaded therein. A concentric stud and concentric screw could be used but this enables standardization on one stud i.e. the eccentric stud. The extension is permanently attached or locked to the stud 76 by applying a cementor adhesive to the threaded extension so that the stud 76, and washer 75, spacer 74 and screw 72 form a solid and second stud unit which is also a concentric unit. The end of the extension has a hexagonal hole 78 in the end thereof to receive a hex wrench so that the unit may be threaded into the end of the bushing 63 to clamp the two units or the duplex unit to the frame.

In using the duplex construction illustrated in FIG. 11, the bushing 63 of the first or eccentric unit is inserted in the bore in the frame. The slotted expanded end retains the bushing within the bore against inadvertent shifting. The position of the eccentric stud 67 is adjusted by insertion of a wrench into the hexagonal bore 70 and turning the same in the bore of the frame. The second or concentric unit is then threaded into the threaded bore or threaded securing hole 71 and by insertion of a wrench in the socket 78, the concentric unit clamps the two units on the frame. The pressure exerted through the screw threads of the screw 72 also further expands the flexible end of the bushing to additionally clamp the bushing and the two units on the frame. The gaging elements are then mounted on the studs and the shoulder means 46 are threaded into their respective threaded holes or bores 66 and 77. In order to change the adjustment the concentric unit is loosened or unclamped whereupon the eccentric unit with the stud 67 is rotated to desired position. When the proper adjustment has been made, the concentric unit is tightened to again clamp the two units to the desired frame. It will be noted that since the periphery of the stud 76 is concentric with the surface of the bushing 63 the adjustment of the eccentric stud 67 does not change the position of the periphery of the stud 76 nor the gaging element mounted thereon.

The duplex or dual stud described would be used as in the gage of FIG. 1 with the eccentric stud on one side for one pair of gaging elements and with the eccentric stud on the other side of the frame for the reverse side gaging elements so that both pairs may be adjusted with respect to its operating gaging element. For a gage as in FIGS. 2 and 3, the single mounted gaging element of the three is eccentric on one side and the double mounted gaging elements may be mounted on eccentric studs on the other side. Also the mounting means in positions 1 and 2 may be mounted the same and in position 3 the mounting means is reversed or positions 1 and 3 may be the same and position 2 reversed. The stud 67 is the same as 42e and as shown the stud 76 is also, however, stud 76 could be stud 42 in which case screw 73 and 72 would be concentric.

This invention is presented to fill a need for improvements in an adjustable gage and gaging element mounting means. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. An adjustable gage comprising frame means having a plurality of spaced mounting holes with a maximum of three extending therethrough, mounting means mounted in each hole and having a bearing surface exterior of the hole, gaging means mounted on each bearing surface; and at least one of said mounting means being adjustable and including a hardened stud having an outer cylindrical surface forming the bearing surface, the stud having an inner end surface accurately squared with respect to the cylindrical bearing surface and an opposite outer end, the cylindrical bearing surface being the surface of maximum diameter on the stud, the stud having a threaded securing hole extending from the inner end thereof, removable shoulder means carried by the outer end of the stud and extending radially beyond the bearing surface, a bushing of soft metal received in a mounting hole in the frame means and having an outer bearing surface slightly smaller than the diameter of the mounting hole and smaller in diameter than the bearing surface of the stud, the bushing having a threaded securing hole therethrough and a stud end and an opposite end, a securing screw received in the stud end of the securing hole in the bushing and extending partially thereinto and received in the securing hole in the stud and securing the bushing and the stud together, a lock screw in the securing hole in the bushing at the opposite end, and one of the securing holes being eccentric to its outer surface.

2. An adjustable gage as in claim 1 in which the bushing has slot means extending from the opposite end and extending beyond the end of the lock screw received in the securing hole in the bushing.

3. An adjustable dual gage comprising frame means including a main frame and a pivoted frame, the frame means having three spaced mounting holes extending therethrough two of which are on the pivoted frame; adjustable mounting means mounted in each hole, each mounting means including a first hardened stud having an outer cylindrical surface forming the bearing surface, the stud having an inner end surface accurately squared with respect to the cylindrical bearing surface and an opposite outer end, the cylindrical bearing surface being the surface of maximum diameter on the stud, the stud having a thread securing hole extending from the inner end thereof, removable shoulder means carried by the outer end of the stud and extending radially beyond the bearing surface, a bushing of soft metal received in a mounting hole in the frame means and having an outer bearing surface slightly smaller than the diameter of the mounting hole and smaller in diameter than the bearing surface of the stud, the bushing having a threaded securing hole therethrough and a stud end and an opposite end, a securing screw received in the stud end of the securing hole in the bushing and extending partially thereinto and received in the securing hole in the stud and securing the bushing and the stud together, a lock screw in the securing hole in the bushing at the slot means end, the securing holes in the stud and bushing being eccentric to its outer bearing surface with the eccentricities being equal and the bearing surfaces being concentric; a second stud identical to the first stud mounted on the lock screw of each mounting means, and one of the mounting means carried by the pivoted frame being reversed with respect to the other two mounting means.

4. An adjustable gage as in claim 1 in which the bushing has slot means extending from the opposite end and extending beyond the end of the lock screw received therein.

5. Mounting means for a gage having frame means with a plurality of mounting holes therein comprising a hardened stud having an outer cylindrical bearing surface and an inner end surface accurately squared with respect to the outer cylindrical bearing surface and an outer end, the cylindrical bearing surface being the surface of maximum diameter on the stud, the stud having removable shoulder means carried by the outer end of the stud and projecting beyond the cylindrical bearing surface, a threaded securing hole at the inner end, a soft metal drag bushing having an outer bearing surface slightly smaller than the diameter of a mounting hole, the bushing having a threaded securing hole therethrough and a stud end and an opposite end, a securing screw received in the securing hole in the bushing at the stud end and extending partially thereinto and received in the securing hole in the stud and securing the bushing and the stud together, a lock screw in the securing hole in the bushing at the opposite end and the securing hole in at least one of the parts including the stud and the bushing being eccentric to its outer bearing surface.

6. Mounting means for a gage as in claim 5 in which the securing hole in the stud is eccentric.

7. Mounting means for a gage as in claim 5 in which the bushing has slot means extending from the opposite end and extending beyond the end of lock screw received in the securing hole in the bushing.

8. Mounting means for a gage as in claim 5 in which the securing hole in the stud and in the bushing is eccentric, the eccentricity being the same in the stud and bushing, and the outer bearing surfaces of the bushing and the stud being concentric with respect to the other.

9. Mounting means for a dual gage as in claim 8 including a second stud identical with the aforesaid stud, and in which the locking screw is longer than the second stud and the latter being mounted on the locking screw.

10. Mounting means for a dual gage as in claim 8 in which the threaded securing hole in the bushing includes a larger threaded securing hole at one end, and a smaller threaded securing hole at the other end, the aforesaid stud being the first stud, and the aforesaid securing screw being the first securing screw, the larger threaded securing hole being the eccentric securing hole, and including a second threaded securing screw in the smaller threaded securing hole and projecting therefrom, and a second stud having an eccentric securing hole therein receiving the projecting end of the second securing screw.

11. Mounting means for a dual gage as in claim 10 including means locking together the first securing screw with the first stud, and means locking together the second securing screw and the second stud.

References Cited by the Examiner

UNITED STATES PATENTS

| 1,279,919 | 1/1918 | Scusa | 33—163 |
| 2,696,675 | 12/1954 | Case | 33—199 |
| 2,940,175 | 6/1960 | Johnson | 33—199 |

ROBERT B. HULL, *Primary Examiner.*